(12) United States Patent
Shetty et al.

(10) Patent No.: US 8,725,078 B2
(45) Date of Patent: May 13, 2014

(54) APPROACH FOR ENABLING COEXISTENCE FOR RADIO TECHNOLOGIES

(75) Inventors: Siddharth Shetty, Mumbai (IN); Punit Rathod, Mumbai (IN); Abhay Karandikar, Mumbai (IN)

(73) Assignee: TTSL IITB Center for Excellence in Telecom (TICET), Mumbai (IN)

( * ) Notice: Subject to any disclaimer, the term of this patent is extended or adjusted under 35 U.S.C. 154(b) by 661 days.

(21) Appl. No.: 12/911,874

(22) Filed: Oct. 26, 2010

(65) Prior Publication Data

US 2012/0008704 A1 Jan. 12, 2012

(30) Foreign Application Priority Data

Jul. 9, 2010 (IN) .......................... 1972/MUM/2010

(51) Int. Cl.
*H04B 1/00* (2006.01)
*H04B 15/00* (2006.01)
*H01Q 11/12* (2006.01)
*H04B 1/04* (2006.01)

(52) U.S. Cl.
USPC ...................................... 455/63.1; 455/127.4

(58) Field of Classification Search
USPC ............ 455/63.1, 67.11, 127.4, 168.1, 176.1,
455/180.1, 188.1, 522, 127.1, 412.2, 114.2,
455/278.1, 296; 375/285
See application file for complete search history.

(56) References Cited

U.S. PATENT DOCUMENTS

| | | | |
|---|---|---|---|
| 6,891,847 B1 * | 5/2005 | Gubbi | 370/442 |
| 7,031,717 B2 * | 4/2006 | Mazzara | 455/450 |
| 7,203,457 B1 * | 4/2007 | Wetzel | 455/3.02 |
| 7,756,542 B1 * | 7/2010 | Kaiser et al. | 455/522 |

* cited by examiner

*Primary Examiner* — Eugene Yun
(74) *Attorney, Agent, or Firm* — Rahman LLC

(57) ABSTRACT

Embodiments disclosed herein relate to wireless communications, and more particularly to reducing interference in wireless communications. The principal object of this invention is to co-ordinate between two or more communication radios, present within the same device or a plurality of devices present close to each other, without interfering with other non-interfering devices. Embodiments disclosed herein disclose a scheme for reducing interference between any licensed and/or unlicensed radio.

27 Claims, 6 Drawing Sheets

APPROACH FOR ENABLING COEXISTENCE FOR RADIO TECHNOLOGIES

BACKGROUND OF INVENTION

1. Field of the Invention

This invention relates to wireless communications, and more particularly to reducing interference in wireless communications.

2. Description of the Related Art

Currently, there are licensed wireless communication bands and unlicensed communication bands existing. In some schemes, the licensed and unlicensed bands are very close to each other. For example, the licensed 2.3 GHz band and the unlicensed 2.4 GHz (IEEE 802.11 based Wi-Fi) bands are very close to each other and might cause interference with each other, especially if operating in close proximity to each other. Consider a device capable of communicating using both a Broadband Wireless Access (BWA) technology such as Long Term Evolution (LTE) or IEEE Worldwide Interoperability for Microwave Access (WiMAX) and Wi-Fi, the signals may interfere with each other if both the above mentioned communications modes happen simultaneously. Similarly, if there are two devices in close proximity, where one of the devices is capable of communicating using Wi-Fi and the second device is capable of communicating using a BWA technology, the signals may interfere with each other if both the devices attempt to communicate simultaneously. Interference between signals may lead to loss in signal quality and subsequent loss of data.

Existing solutions may use a more robust modulation or coding scheme for the licensed bands to reduce self-interference. However, this approach results in a drop in capacity of the overall system.

Another existing solution makes use of filters to filter out the interfering signal. However, filters may not be effective in combating interference, when there is no guard band present in the communication bands. Further, addition of filters may results in an increase in cost of the devices.

The current 802.16 draft specification includes an interference mitigation scheme between communication radios present within a single device. The draft specification assumes that the communications radios can communicate with each other using OS controlled hardware signaling and hence are able to perform time division multiplexing of the communication signals over the shared communication channel.

Other solutions also talk about mitigating interference between communication radios present within a single device. The solution makes use of a control signal transmitted over the air by the interfering radio to back off its own transmissions for a time period specified in the control signal. However, the primary disadvantage is that the control signal which is transmitted over the air may inhibit communications to be carried out by other devices present within the vicinity, causing widespread disruption for an entire non-interfering network.

SUMMARY OF THE INVENTION

In view of the foregoing, an embodiment herein provides a method for coordinating use of a radio channel between a Broadband Wireless Access (BWA) communication radio and at least one IEEE 802.11 communication radio, the method comprising steps of a controller module sending a notification indicating a radio activity to a first IEEE 802.11 communication radio; the first IEEE 802.11 communication radio computing a time for which the channel has to be cleared from the notification; the first IEEE 802.11 communication radio computing transmission power of a channel clear message from channel sensing measurements; the first IEEE 802.11 communication radio transmitting the channel clear message at the transmission power to an interfering IEEE 802.11 communication radio; and the interfering IEEE 802.11 communication radio halting radio activity on the radio channel for the time. The method further comprises of the BWA communication radio extracting BWA timing information from at least one packet received from a BWA base station; the BWA communication radio sending the BWA timing information to a controller module; and the controller module storing the BWA timing information. The method further comprises of the IEEE 802.11 communication radio extracting IEEE 802.11 timing information from at least one packet received from an 802.11 Access Point; the IEEE 802.11 communication radio sending the IEEE 802.11 timing information to the controller module; and the controller module storing the IEEE 802.11 timing information. The controller module sends the notification depending on one of the BWA timing information and the IEEE 802.11 timing information. The notification comprises of time duration of the radio activity. The time for which the channel has to be cleared is calculated in terms of Clear to Send Frame (CTS) Network Allocation Vector (NAV) parameters. The time for which the channel has to be cleared is calculated as the difference between time duration of the radio activity and standard system timing parameters. The transmission power depends on Received Signal Strength Indication of the interfering 802.11 communication radio. The interfering 802.11 communication radio is identified by comparing the Received Signal Strength Indication to a pre-defined Received Signal Strength Indication level. The channel which has to be cleared is included in the channel clear message.

Embodiments herein further disclose a system for coordinating use of a radio channel between a BWA communication radio and at least one 802.11 communication radio, the system comprising at least one means configured for enabling a controller module to send a notification indicating a radio activity to a first 802.11 communication radio; enabling the first 802.11 communication radio to compute a time for which the channel has to be cleared from the notification; enabling the first 802.11 communication radio to compute transmission power of a channel clear message from the notification; enabling the first 802.11 communication to transmit the channel clear message at the transmission power to interfering 802.11 communication radio; and enabling the interfering 802.11 communication radio to halt radio activity on the radio channel for the time. The system comprises at least one means configured for enabling the BWA communication radio to extract BWA timing information from at least one packet received from a BWA base station; enabling the BWA communication radio sending the BWA timing information to a controller module; and enabling the controller module to store the BWA timing information. The system further comprises at least one means configured for enabling the 802.11 communication radios to extract 802.11 timing information from at least one packet received from a 802.11 Access Point; enabling the 802.11 communication radios to send the 802.11 timing information to the controller module; and enabling the controller module to store the 802.11 timing information. The controller module is configured for sending the notification depending on one of the BWA timing information and the 802.11 timing information. The controller module is configured for including time duration of the radio activity in the notification. The first 802.11 communication radio is configured for calculating the time for which the channel has to be cleared in terms of CTS NAV parameters. The first 802.11 communication radio is configured for calculating the time for which the channel has to be cleared as the difference between time duration of the radio activity and standard system timing parameters. The first 802.11 communication radio is configured for calculating the transmission power based on Received Signal Strength Indication of the interfering 802.11 communication radio. The first 802.11 communication radio is configured for identifying the interfering 802.11 communication radio by comparing the Received Signal Strength Indication to a pre-defined Received Signal Strength Indication level. The first 802.11 communication radio is configured for including the time for which the channel has to be cleared in the channel clear message.

Also, disclosed herein is a 802.11 communication radio adapted for coordinating use of a radio channel between a BWA communication radio and the 802.11 communication radio or another 802.11 communication radio, the 802.11 communication radio comprising at least one means configured for receiving a notification indicating a radio activity from a controller module; computing a time for which the channel has to be cleared from the notification; computing transmission power of a channel clear message by means of channel sensing measurements. The 802.11 communication radio further comprises at least one means configured for extracting 802.11 timing information from at least one packet received from a 802.11 Access Point; and sending the 802.11 timing information to the BWA communication radio. The 802.11 communication radio is adapted for calculating time for which the channel has to be cleared in terms of CTS NAV parameters. The 802.11 communication radio is adapted for calculating time for which the channel has to be cleared as the difference between time duration of the radio activity and standard system timing parameters. The 802.11 communication radio is adapted for calculating the transmission power based on Received Signal Strength Indication of interfering 802.11 communication radio. The 802.11 communication radio is adapted for including the time for which the channel has to be cleared in the channel clear message. The 802.11 communication radio is adapted for transmitting the clear channel message to the interfering 802.11 communication radio.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which consistently reference letters indicate corresponding parts in the various figures. The embodiments herein will be better understood from the following description with reference to the drawings, in which.

DETAILED DESCRIPTION

Figure 1:
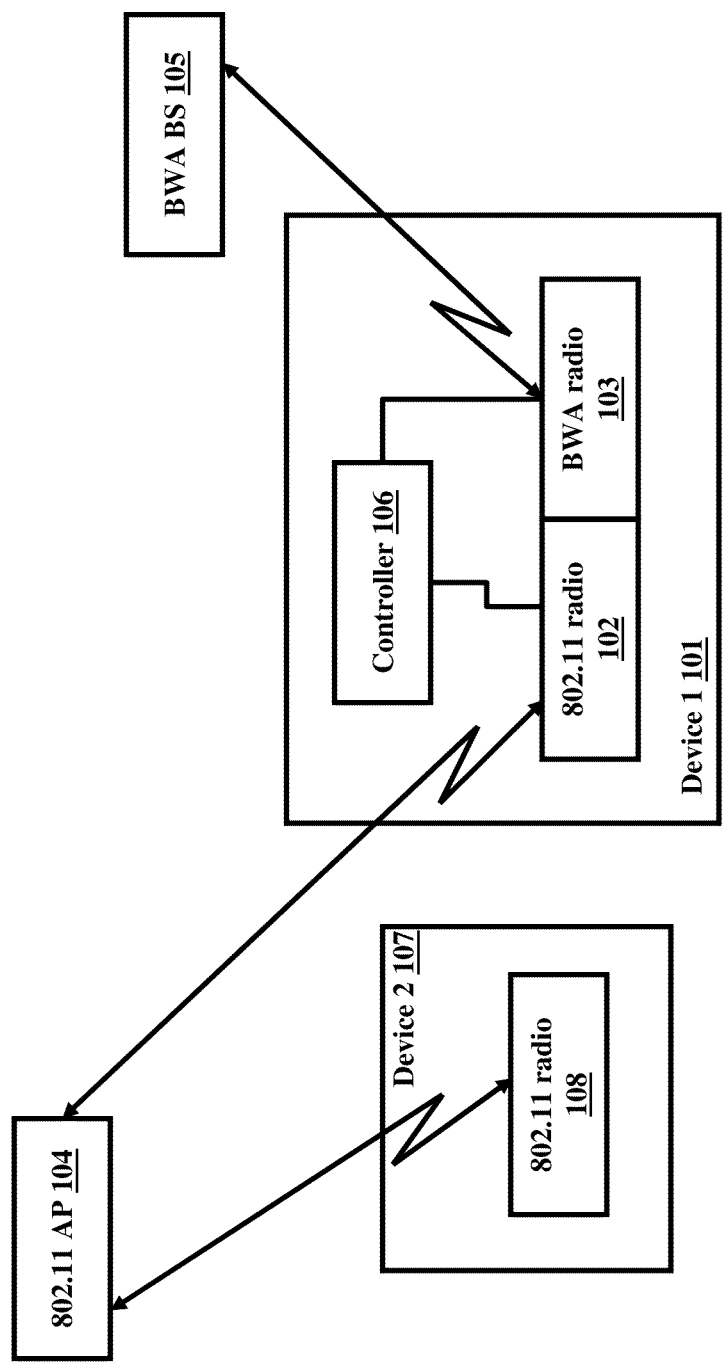
FIG. 1 depicts a communication system, according to embodiments as disclosed herein.

The embodiments herein and the various features and advantages thereof are explained more completely with reference to the non-limiting embodiments that are illustrated in the accompanying drawings and detailed in the following description. Descriptions of well-known components and processing techniques are omitted so as not to unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a method of co-ordination between two or more communication radios, present within the same device or a plurality of devices present close to each other, without interfering with other non-interfering devices. Referring now to the drawings, and more particularly to FIGS. 1 through 6, where similar reference characters denote corresponding features consistently throughout the figures, there are shown preferred embodiments.

FIG. 1 depicts a communication system, according to embodiments as disclosed herein. The system as depicted comprises of device 101 and a device 107, the Broadband Wireless Access (BWA) Base Station (BS) 105 and an 802.11 AP 104. The device 101 further comprises of a controller 106, an 802.11 interface 102 and a BWA radio 103. The BWA radio 103 may communicate with the BWA BS 105 using suitable means. The 802.11 radio 102 may communicate with the 802.11 Access Point (AP) 104 using suitable means. The 802.11 radio 102 may also communicate with the BWA radio 103 using suitable means. The device 107 also comprises of an 802.11 radio 108. Device 107 is located in the interference range of the neighboring device 101. The 802.11 radio 108 communicates with the 802.11 AP 104 using suitable means. The 802.11 radio 108 may also communicate with another 802.11 AP, which is distinct from the 802.11 AP 104.

The 802.11 radio 102 monitors all the interfering signals received at its air interface as part of a channel sensing operation. This sensing operation could be overseen by the controller 106. The 802.11 radio 102 then compares the signal strength (using the Receive Signal Strength Indicator RSSI parameter) of the interfering signal with a threshold level. The threshold level may be set by the user of the device 101. In other embodiments, the threshold level may be set by the manufacturer of the device or the operator of the licensed service running on device 101. In other embodiments, this recorded RSSI may also be communicated to another radio system. If the signal strength of the interfering signal is greater than or equal to the threshold, the 802.11 radio 102 extracts information from the interfering signal. The information extracted may comprise of Basic Service Set Identifier (BSSID), address of the corresponding AP and the signal strength of the interfering signal. The BSSID may be extracted from the MAC header of the packets present in the interfering signal. The address of the corresponding AP may be extracted from the MAC header of the packets present in the interfering signal. In other embodiments, the Service Set Identification (SSID) may be extracted. In other embodiments, the Extended Service Set Identification (ESSID) may be extracted. The 802.11 radio 102 monitors beacons from the AP using the captured BSSID. The 802.11 radio 102 on receiving a beacon belonging to the identified AP, extracts channel information and timing information from the beacon. The channel information and timing information may be extracted from the management headers in the beacon. The 802.11 radio 102 stores the channel information in a memory storage area. The 802.11 radio 102 further sends this channel information and timing information to the controller 106. The 802.11 radio 102 may also send the RSSI information to the controller 106 which may communicate this information to the BWA BS 105 via the BWA radio 103.

The BWA radio 103 receives data packets from the BWA BS 105. The data packets may be control information containing scheduling information or traffic intended for the BWA radio itself. In case of control information the BWA radio 103 analyses the data packets and extracts the time slot or time slots, where a communication may be made between the BWA radio 103 and the BWA BS 105. This time slots information may be reported to the controller (106) for coordination activities. The communication may be a transmission from the BWA radio 103 to the BWA BS 105 or vice versa.

At a predetermined time, the controller 106 sends a message to the 802.11 radio 102, where the message contains information related to the time slot. The predetermined time may be a suitable time before the time slot. The information comprises of the start of the time slot, the time duration of the time slot and any related information. The 802.11 radio 102 extracts the required information from the message and computes the time duration that the channel has to be cleared. The time duration for which the channel has to be cleared may be computed in terms of the Clear to Send Frame (CTS) Network Allocation Vector (NAV) parameters. The 802.11 radio 102 further determines the power level for transmitting a channel clearing message. The power level of the channel clearing message is determined so that the channel clearing message does not affect communications of other non-interfering radios located at nearby locations. The 802.11 radio 102 determines the power level using Table 1.

TABLE 1

| RSSI of interferer | Transmit power level |
|---|---|
| $RSSI_1$-$RSSI_2$ | $TP_1$ |
| $RSSI_2$-$RSSI_3$ | $TP_2$ |
| . | . |
| . | . |
| . | . |
| $RSSI_{(n-1)}$-$RSSI_n$ | $TP_{(n-1)}$ |

For example, if the RSSI (received signal strength indication) of the interfering radio, here the interfering radio is 802.11 radio 108, is between $RSSI_2$-$RSSI_3$, then the transmit power level is chosen as $TP_2$.

The 802.11 radio 102 transmits the clear channel message at the determined power level to the 802.11 radio 108. The clear channel message also comprises of the time the channel has to be clear. On receiving the clear channel message, the 802.11 radio 108 back off its transmissions at least for the time as specified in the clear channel message. After the specified time period, the 802.11 radio 108 may contend for the channel as part of the normal channel access procedure specified in the 802.11 standard.

Embodiments disclosed above depict the controller 106 instructing the 802.11 radio 108 to back of its transmissions via the 802.11 radio 102, so that the BWA radio 103 may perform communication. In another embodiment herein, the 802.11 radio 102 may facilitate deferred transmission periods for BWA radio 103, so that the 802.11 radio 108 may perform communication.

The communication radios as described above are exemplary and a scheme to reducing interference between any licensed and/or unlicensed radio may be implemented as per embodiments disclosed herein. For example, the BWA radio 103 may be any radio capable of communication using the licensed communication band and the 802.11 radio 102 and the 802.11 radio 108 may be radios capable of communicating using the unlicensed band.

In another embodiment herein, the controller 106 receives packets from the BWA radio 103 and the 802.11 radio 102. The controller 106 then analyses the packets, extracts the relevant information from the packet and stores the information. The controller 106 may also receive packets from the 802.11 radio 108 via the 802.11 radio 102 and may perform the required analysis on the received packets.

Figure 2:
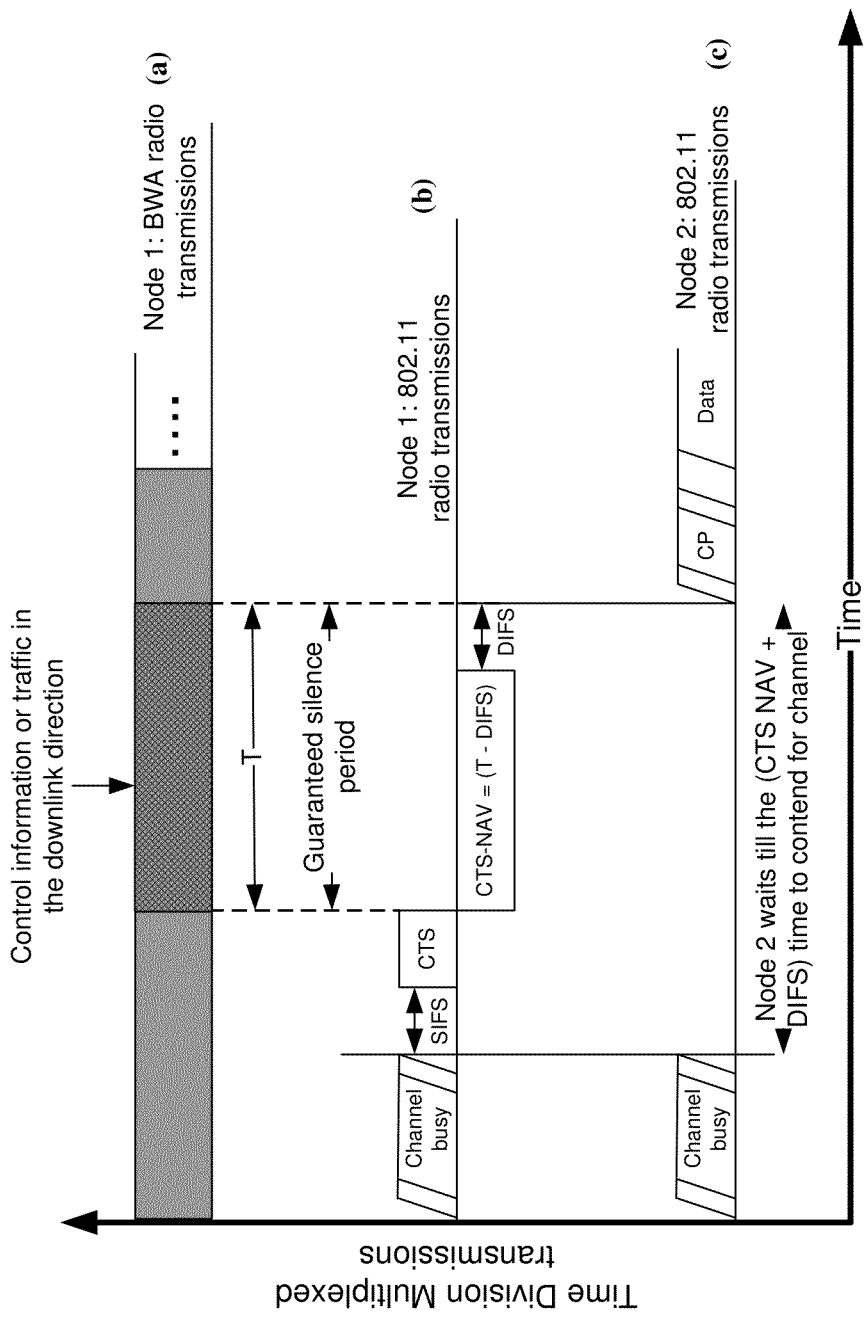
FIGS. 2 and 3 depict examples, according to embodiments as disclosed herein.

FIG. 2 depicts an example, according to embodiments as disclosed herein. According to the example depicted herein, FIGS. 2(a), (b) and (c) depict transmissions from the BWA radio 103, the 802.11 radio 102 and the 802.11 radio 108 respectively.

Figure 3:
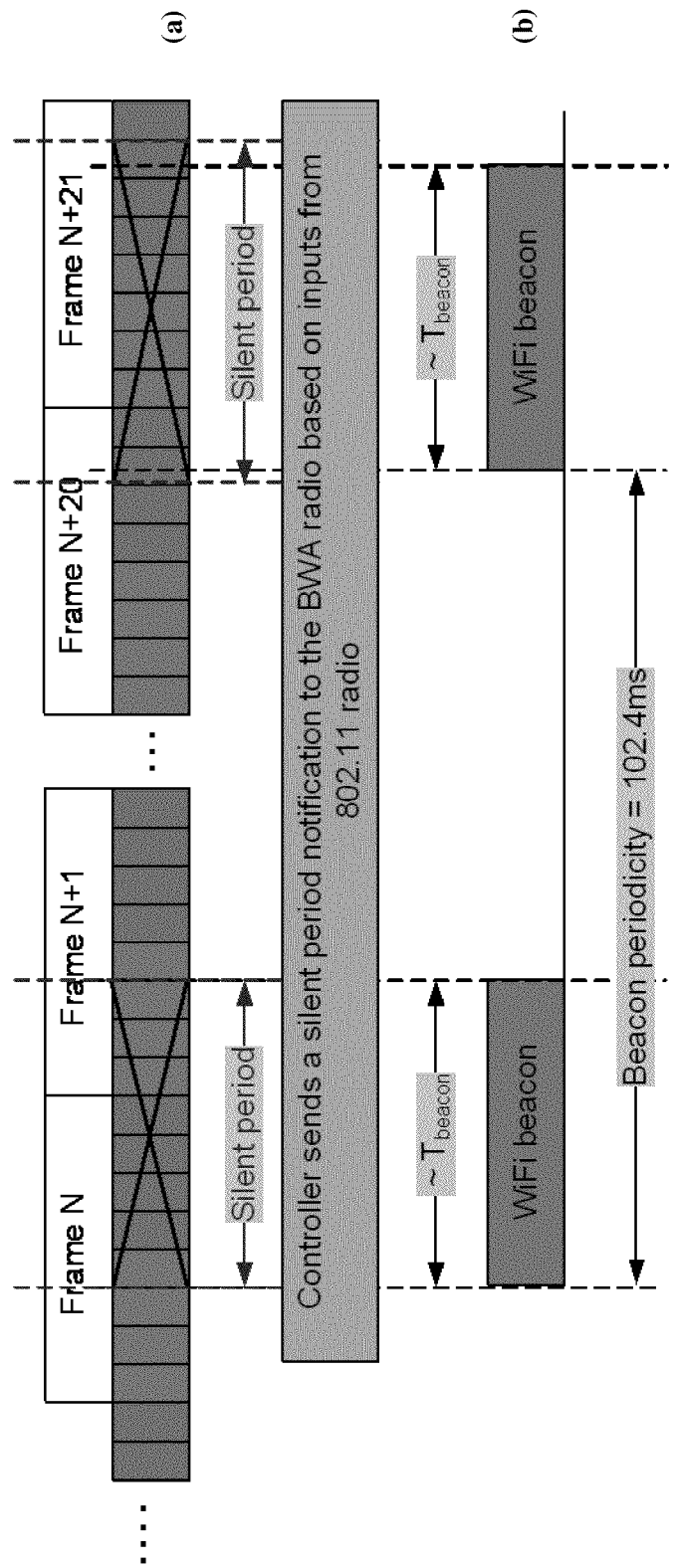

FIG. 3 depicts an example, according to embodiments as disclosed herein. According to the example depicted herein, FIGS. 3(a) and (b) depict transmissions from the BWA radio 103 and the 802.11 AP 104 respectively.

Figure 4:
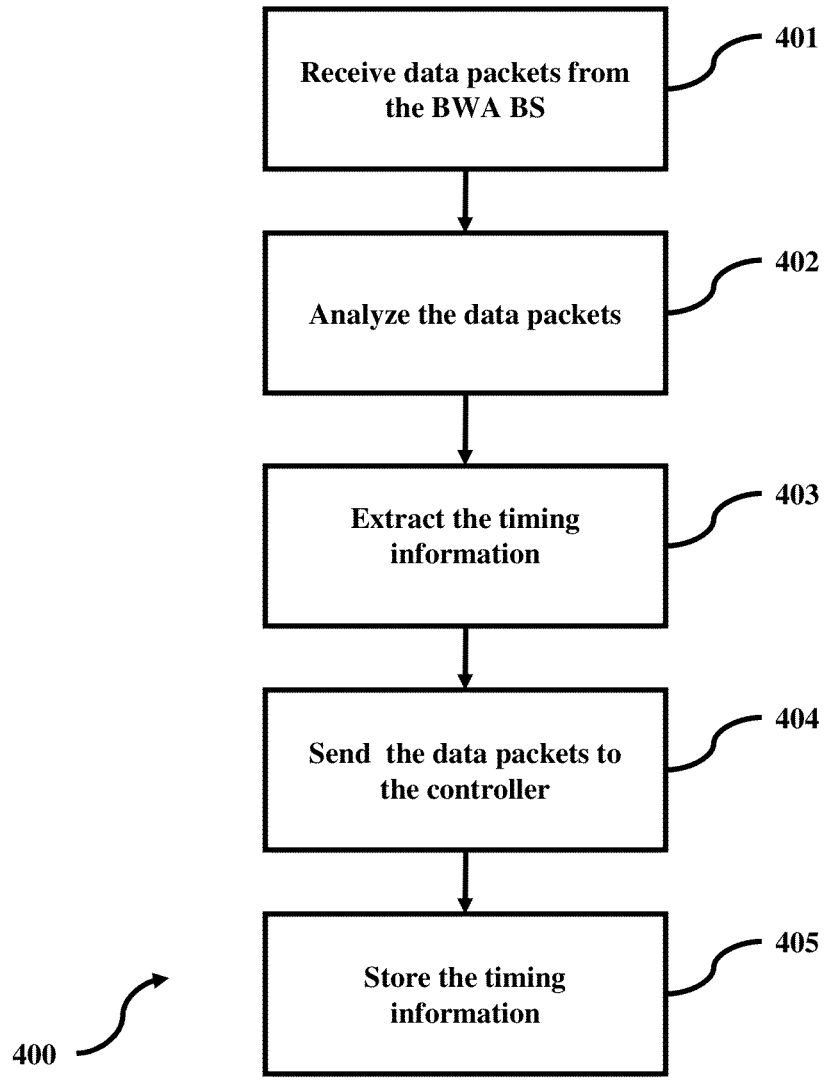
FIGS. 4, 5 and 6 depict flowcharts, according to embodiments disclosed herein.

FIG. 4 depicts a flowchart, according to embodiments as disclosed herein. The BWA radio 103 receives (401) data packets from the BWA BS 105. The data packets may be control information. For example, the data packets may be a MAP message or a paging message. The BWA radio 103 analyses (402) the data packets and extracts (403) the time slot or time slots, where a communication may be made between the BWA radio 103 and the BWA BS 105. The communication may be a transmission from the BWA radio 103 to the BWA BS 105 or vice versa. The BWA radio 103 sends (404) the extracted information to the controller 106, which stores (405) the extracted information. The various actions in method 400 may be performed in the order presented, in a different order or simultaneously. Further, in some embodiments, some actions listed in FIG. 4 may be omitted.

Figure 5:
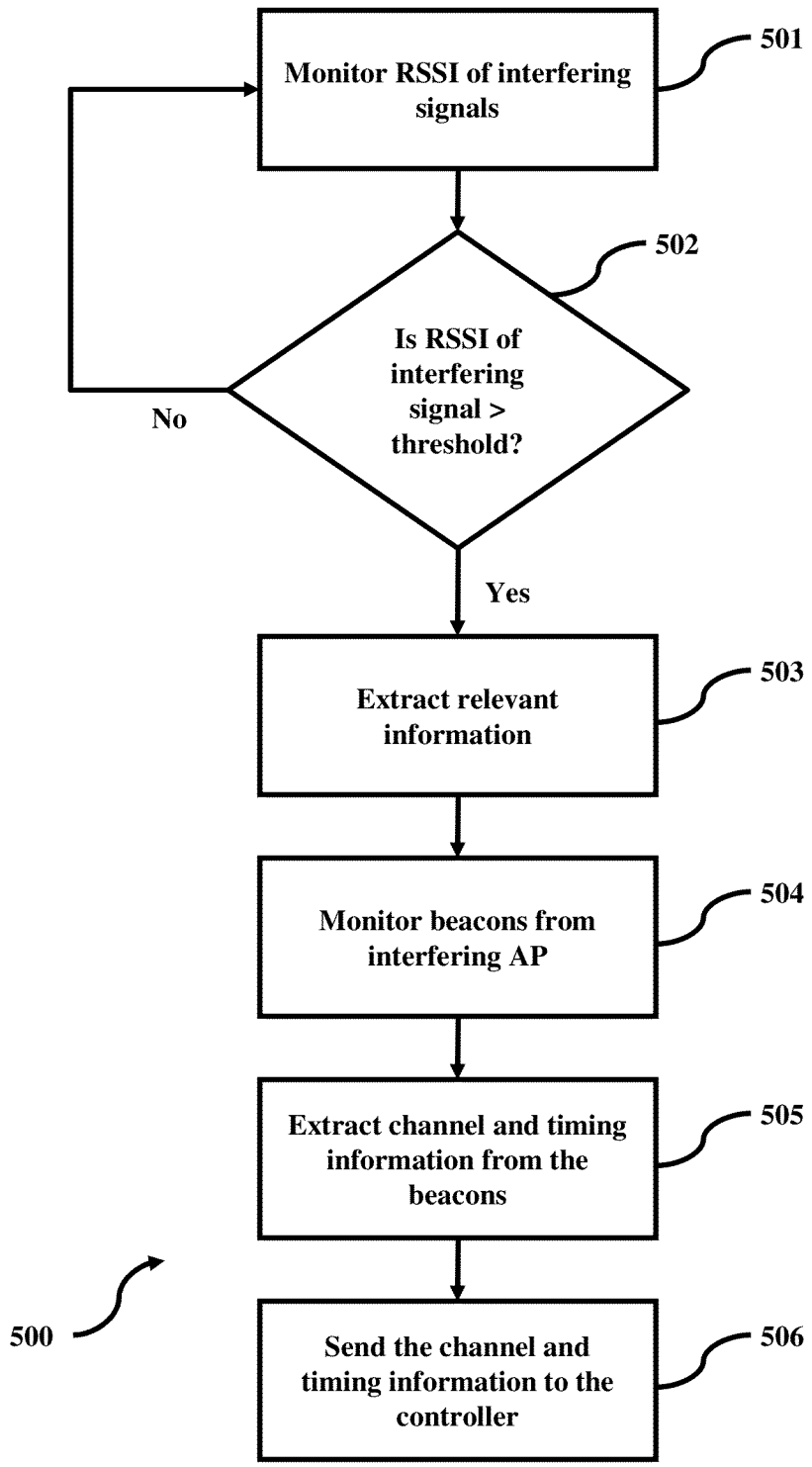

FIG. 5 depicts a flowchart, according to embodiments as disclosed herein. The 802.11 radio 102 monitors (501) all the interfering signals received at its air interface as part of the sensing operation. This sensing operation could be overseen by the controller 106. The 802.11 radio 102 then compares (502) the signal strength (RSSI parameter) of the interfering signal with a threshold level. The threshold level may be set by the user of the device 101. In other embodiments, the threshold level may be set by the manufacturer of the device or the operator of the licensed service running on device 101. If the signal strength of the interfering signal is greater than or equal to the threshold, the 802.11 radio 102 extracts (503) information from the interfering signal. The information extracted may comprise of Basic Service Set Identifier (BSSID), address of the corresponding AP and the signal strength of the interfering signal. The BSSID may be extracted from the MAC header of the packets present in the interfering signal. The address of the AP may be extracted from the MAC header of the packets present in the interfering signal. In other embodiments, the Service Set Identification (SSID) may be extracted. In other embodiments, the Extended Service Set Identification (ESSID) may be extracted. The 802.11 radio 102 monitors (504) beacons from the AP using the captured BSSID. The 802.11 radio 102 on receiving a beacon belonging to the AP, extracts (505) channel information and timing information from the beacon. The channel information and timing information may be extracted from the management headers in the beacon. The 802.11 radio 102 stores the channel information and timing information in a memory storage area. The 802.11 radio 102 further sends (506) this channel information and timing information to the controller 106. The various actions in method 500 may be performed in the order presented, in a different order or simultaneously. Further, in some embodiments, some actions listed in FIG. 5 may be omitted.

Figure 6:
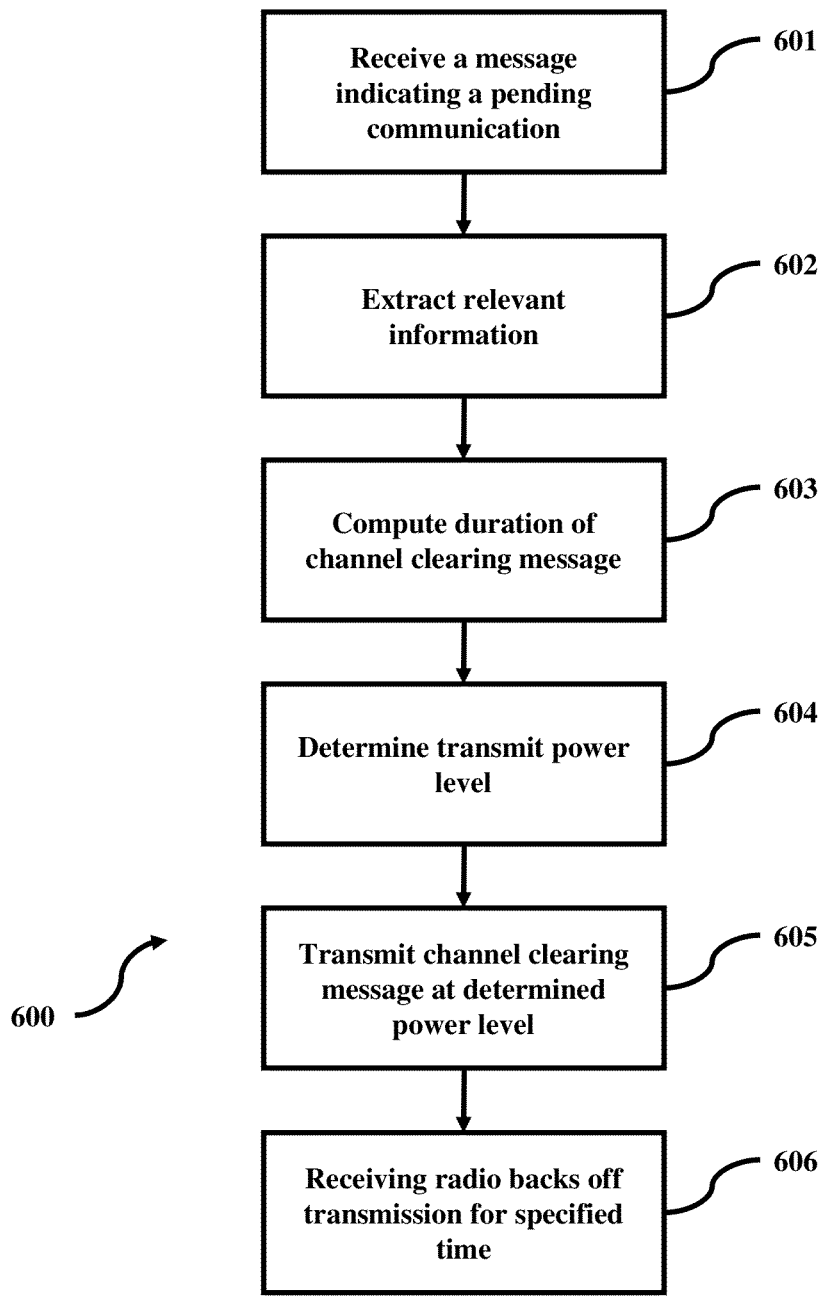

FIG. 6 depicts a flowchart, according to embodiments as disclosed herein. At a predetermined time, the 802.11 radio 102 receives (601) a message from the controller 106, where the message contains information related to the time slot. The predetermined time may be a suitable time before the time slot. The information comprises of the start of the time slot, the time duration of the time slot and any related information. The 802.11 radio 102 extracts (602) the required information from the message and computes (603) the time duration that the channel has to be cleared. The time duration for which the channel has to be cleared may be computed in terms of the CTS NAV parameters. The 802.11 radio 102 further determines (604) the power level for transmitting a channel clearing message. The power level of the channel clearing message is determined so that the channel clearing message does not interfere with communication radios located at nearby locations. The 802.11 radio 102 transmits (605) the clear channel message at the determined power level to the 802.11 radio 108. The clear channel message also comprises of the time the channel has to be clear. On receiving the clear channel message, the 802.11 radio 108 backs off its transmissions (606) for the time as specified in the clear channel message. After the specified time period, the 802.11 radio 108 may contend for the channel as part of the normal channel access procedure specified in the 802.11 standard. The 802.11 radio 108 may also follow any other suitable mode, wherein the 802.11 radio 108 does not make any communication for the time as specified in the clear channel message. The various actions in method 600 may be performed in the order presented, in a different order or simultaneously. Further, in some embodiments, some actions listed in FIG. 6 may be omitted.

Embodiments herein disclose use of BWA technologies, which may comprise of WiMAX (Worldwide Interoperability for Microwave Access), 3GPP LTE (Long Term Evolution) and so on.

The embodiment disclosed herein specifies a system for reducing interference in wireless communication networks. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will completely reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for coordinating use of a radio channel between a first type of communication radio that communicates using a licensed communication band and at least one second type of communication radio that communicates using an unlicensed communication band, said method comprising:

a controller module sending a notification indicating a radio activity to a first one of said second type of communication radio;

said first one of said second type of communication radio computing a time for which the channel has to be cleared from said notification;

said first one of said second type of communication radio computing transmission power of a channel clear message from channel sensing measurements;

said first one of said second type of communication radio transmitting said channel clear message at said transmission power to an interfering second type of communication radio; and said interfering second type of communication radio halting radio activity on said radio channel for said time.

2. The method of claim 1, wherein said method further comprises of:

said first type of communication radio extracting a first type of communication radio timing information from at least one packet received from a first type of communication radio base station;

said first type of communication radio sending said first type of communication radio timing information to a controller module; and said controller module storing said first type of communication radio timing information.

3. The method of claim 2, wherein said method further comprises of:

said second type of communication radio extracting a second type of communication radio timing information from at least one packet received from a second type of communication access point;

said second type of communication radio sending said second type of communication radio timing information to said controller module; and said controller module storing said second type of communication radio timing information.

4. The method of claim 3, wherein said controller module sends said notification depending on one of said first type of communication radio timing information and said second type of communication radio timing information.

5. The method of claim 1, wherein said notification comprises a time duration of said radio activity.

6. The method of claim 1, wherein said time for which said channel has to be cleared is calculated in terms of Clear to Send frame (CTS) Network Allocation Vector (NAV) parameters.

7. The method of claim 1, wherein said time for which said channel has to be cleared is calculated as a difference between a time duration of said radio activity and standard system timing parameters.

8. The method of claim 1, wherein said transmission power depends on a Received Signal Strength Indication of said interfering second type of communication radio.

9. The method of claim 8, wherein said interfering second type of communication radio is identified by comparing said Received Signal Strength Indication to a pre-defined Received Signal Strength Indication level.

10. The method of claim 1, wherein said time for which said channel has to be cleared is included in said channel clear message.

11. A system for coordinating use of a radio channel between a first type of communication radio that communicates using a licensed communication band and at least one second type of communication radio that communicates using an unlicensed communication band, said system comprising at least one means configured for:
   enabling a controller module to send a notification indicating a radio activity to a first one of said second type of communication radio;
   enabling said first one of said second type of communication radio to compute a time for which the channel has to be cleared from said notification;
   enabling said first one of said second type of communication radio to compute transmission power of a channel clear message from said notification;
   enabling said first one of said second type of communication to transmit said channel clear message at said transmission power to interfering second type of communication radio; and
   enabling said interfering second type of communication radio to halt radio activity on said radio channel for said time.

12. The system of claim 11, wherein said system comprises at least one means configured for:
   enabling said first type of communication radio to extract a first type of communication radio timing information from at least one packet received from a first type of communication radio base station;
   enabling said first type of communication radio sending said first type of communication radio timing information to a controller module; and
   enabling said controller module to store said first type of communication radio timing information.

13. The system of claim 12, wherein said system further comprises at least one means configured for:
   enabling said second type of communication radio to extract a second type of communication radio timing information from at least one packet received from a second type of communication access point;
   enabling said second type of communication radio to send said second type of communication radio timing information to said controller module; and
   enabling said controller module to store said second type of communication radio timing information.

14. The system of claim 13, wherein said controller module sends said notification depending on one of said first type of communication radio timing information and said second type of communication radio timing information.

15. The system of claim 11, wherein said controller module is configured for including a time duration of said radio activity in said notification.

16. The system of claim 11, wherein said first one of said second type of communication radio calculates said time for which said channel has to be cleared in terms of Clear to Send frame (CTS) Network Allocation Vector (NAV) parameters.

17. The system of claim 11, wherein said first one of said second type of communication radio calculates said time for which said channel has to be cleared as a difference between time duration of said radio activity and standard system timing parameters.

18. The system of claim 11, wherein said first one of said second type of communication radio calculates said transmission power based on a Received Signal Strength Indication of said interfering second type of communication radio.

19. The system of claim 18, wherein said first one of said second type of communication radio identifies said interfering second type of communication radio by comparing said Received Signal Strength Indication to a pre-defined Received Signal Strength Indication level.

20. The system of claim 11, wherein said first one of said second type of communication radio is configured for including said time for which said channel has to be cleared in said channel clear message.

21. A second type of communication radio that communicates using an unlicensed communication band and that coordinates use of a radio channel between a first type of communication radio that communicates using a licensed communication band and said second type of communication radio or another second type of communication radio that communicates using said unlicensed communication band, said second type of communication radio comprising at least one means configured for:
   receiving a notification indicating a radio activity from a controller module;
   computing a time for which the channel has to be cleared from said notification;
   computing transmission power of a channel clear message by means of channel sensing measurements.

22. The second type of communication radio of claim 21, wherein said second type of communication radio further comprises at least one means configured for:
   extracting a second type of communication radio timing information from at least one packet received from a second type of communication access point; and
   sending said second type of communication radio timing information to said first type of communication radio.

23. The second type of communication radio of claim 21, wherein said second type of communication radio calculates a time for which said channel has to be cleared in terms of Clear to Send frame (CTS) Network Allocation Vector (NAV) parameters.

24. The second type of communication radio of claim 21, wherein said second type of communication radio calculates a time for which said channel has to be cleared as the difference between time duration of said radio activity and standard system timing parameters.

25. The second type of communication radio of claim 21, wherein said second type of communication radio calculates said transmission power based on a Received Signal Strength Indication of an interfering second type of communication radio.

26. The second type of communication radio of claim 21, wherein said second type of communication radio is adapted for including said time for which said channel has to be cleared in said channel clear message.

27. The second type of communication radio of claim 21, wherein said second type of communication radio transmits said clear channel message to an interfering second type of communication radio.

* * * * *